United States Patent [19]

Jones

[11] Patent Number: 5,720,904
[45] Date of Patent: Feb. 24, 1998

[54] ELECTROCONDUCTIVE TIN OXIDE

[75] Inventor: Stanley Jones, Gerrards Cross, United Kingdom

[73] Assignee: Alcan International Limited, Quebec, Canada

[21] Appl. No.: 628,613

[22] PCT Filed: Oct. 12, 1994

[86] PCT No.: PCT/GB94/02234

§ 371 Date: Jun. 26, 1996

§ 102(e) Date: Jun. 26, 1996

[87] PCT Pub. No.: WO95/11512

PCT Pub. Date: Apr. 27, 1995

[30] Foreign Application Priority Data

Oct. 18, 1993 [GB] United Kingdom ............... 9321481

[51] Int. Cl.$^6$ ........................ H01B 1/06; C01G 19/02
[52] U.S. Cl. .............................................. 252/518
[58] Field of Search ........................ 423/618; 252/518

[56] References Cited

U.S. PATENT DOCUMENTS

| | | | |
|---|---|---|---|
| 2,490,825 | 12/1949 | Mochel | 252/518 |
| 2,692,836 | 10/1954 | McAuley | 252/518 |
| 3,044,901 | 7/1962 | Garnsworthy | 252/518 |
| 3,340,006 | 9/1967 | Mochel | 252/518 |
| 4,223,049 | 9/1980 | Murray et al. | 427/126 |
| 4,246,143 | 1/1981 | Sonoda et al. | 423/618 |
| 4,514,322 | 4/1985 | Swoboda | 252/518 |
| 5,401,441 | 3/1995 | Robert et al. | 423/618 |

FOREIGN PATENT DOCUMENTS

| | | | |
|---|---|---|---|
| 95775 | 12/1983 | European Pat. Off. | 252/518 |
| 0 173 609 | 3/1986 | European Pat. Off. | |
| 0 235 968 | 9/1987 | European Pat. Off. | |
| 0 448 946 | 10/1991 | European Pat. Off. | |
| 2304998 | 3/1975 | France | 252/518 |
| 60-186416 | 9/1985 | Japan | 423/618 |
| 60-260424 | 12/1985 | Japan | 423/618 |

*Primary Examiner*—Steven Bos
*Attorney, Agent, or Firm*—Browdy and Neimark

[57] ABSTRACT

Electroconductive doped tin (IV) oxide is produced in bulk by combining a first material which is selected from:

a) a thermal precursor of a dopant element;

b) a tin (II) compound comprising a dopant element; and c) a mixture of materials each falling within (a) or (b);

with a second solid material which is tin (II) oxide or a thermal precursor thereof, heating the combined materials and oxidising the heated combined materials, wherein the dopant element is or comprises phosphorus, boron, tungsten, tantalum or niobium. Halogen may also be present. Preferably the combined materials are in solid form, and the oxidation step includes atmospheric oxidation at an elevated temperature. The conductive oxide may be used in a non-consumable electrode, or as a filler for a polyolefin, for example.

12 Claims, No Drawings

ELECTROCONDUCTIVE TIN OXIDE

FIELD OF THE INVENTION

This invention relates to the preparation and use of electroconductive doped tin oxide, and particularly to the preparation and use of electroconductive doped tin oxide in bulk form.

BACKGROUND OF THE INVENTION

Doped tin oxide is an example of a semiconductor. The lattice of the latter can accommodate ions of different valencies. Such ions are not necessarily of similar size to tin (IV) or oxygen (II). The relative concentration of the differing ions can be used to control the electrical conductivity.

It is well known to dope tin oxide to produce and electrically conductive material. Thus for example antimony doped films have been commonly used as transparent conductive films for light modulating devices and displays, and there is also a considerable body of literature relating to the formation of fluoride doped films. However, references to the production of electroconductive doped tin oxide in bulk, for example as a powder, as opposed to thin films, are rare.

While at first this may appear strange, it should be remembered that simultaneous co-precipitation of anions is rarely, if ever, possible. When forming a film, conditions may be such that the simultaneous thermal decomposition of dopant and tin containing chemicals, upon contact with a heated substrate, increases the chances of dopant being incorporated into the tin oxide lattice. Examples of the reactions employed for film formation are: $BuSnCl_3$ +Sn$(BF_4)_2$; $Bu_2Sn(OBu)_2$+$CF_3CO_2H$; $SnCl_4$+$NH_4F$; and $MeSnCl_3$+HF.

DESCRIPTION OF THE PRIOR ART

A method of producing fluoride doped tin oxide is disclosed in EP 0 448 946 in which a tin (II) oxide or oxide precursor is intimately mixed with tin (II) fluoride and heated in an oxidising atmosphere to produce fluoride doped tin (IV) oxide.

Common dopants for tin oxide are antimony and fluoride. These suffer from a number of disadvantages, not least that the starting materials are toxic and unpleasant. In addition, fluoride doped tin oxides are temperature sensitive and lose fluoride and electrical conductivity when exposed to high temperature. One alternative dopant which shows promise is phosphorus. However, to date the only technique reported for producing phosphorus doped tin (IV) oxide, as disclosed in U.S. Pat. No. 4,514,322, involves milling metastannic acid with elemental phosphorus. This is clearly not a desirable operation.

One method for producing a fluorine doped tin oxide material in bulk form is disclosed in Japanese Patent Application HEISEI 2-197014, published 3 Aug., 1990 (filing no. HEISEI 1-17196). This describes the treatment of stannic oxide with fluorine gas in an inert gas diluent, preferably at elevated temperatures (300° to 600° C.). Clearly a process involving fluorine gas, particularly at elevated temperatures, has attendant difficulties, and one of our aims was to develop a simpler process than this.

Another method is described in EP 0 441 427 in which a non-aqueous solution of a tin (IV) salt is combined with an aqueous fluoride, the resulting co-precipitated hydroxide materials being dried and heated to at least 600° C., preferably under nitrogen. Whilst the fluoride could be tin (II) fluoride, there is no teaching that air oxidation of a stannous component could be beneficial.

European Patent Application 0 235 968 A discloses a process in which an aqueous medium containing a tin (II) carboxylate and a dopant material is treated with hydrogen peroxide to provide a transparent solution. After shaping (for example, formation of a membrane on a substrate) or conversion to a powder, e.g. by spray drying, this material is calcined to produce conductive tin oxide. Clearly in such a case oxidation by hydrogen peroxide is a "wet" process at relatively low temperatures, as compared to the relatively high temperature oxidation of a solid material in embodiments of the present invention.

SUMMARY OF THE INVENTION

The present invention provides a method of producing an electroconductive doped tin (IV) oxide comprising producing a mixture by combining a first material which is selected from:

a) a clean thermal precursor of a dopant;

b) a tin (II) compound comprising a dopant; and c) a mixture of materials each falling within (a) or (b);

with a second material which is tin (II) oxide or a clean thermal precursor thereof, heating the combined materials and oxidising the heated combined materials, wherein the dopant is or comprises an element other than a halogen.

A convenient way of effecting the oxidising step is by exposure to an oxidising atmosphere such as air.

The dopant, other than halogen, may comprise any species which is capable of being incorporated into the tin (IV) oxide lattice to produce a stable compound with, for example, low electrical resistance, or a relatively sensitive photoconductivity. In the lattice the dopant species may be considered to be cationic or anionic. A mixture of two or more dopant species can be used to advantage.

For the avoidance of confusion, in the following description and claims, elements are designated according to a version of the periodic table in which the transition elements, e.g. Sc to Zn, are in groups IIIa to IIb, and the remaining, non-transition, elements, such as P and B, fall within groups IIIb to IIa.

A suitable dopant may be or comprise a Group Vb element, a particularly suitable species being P(V); or it may be or comprise a Group IIIb element such as boron. It may also comprise or be a member of the transition metal series, for example, a Group Va or VIa element. It may also comprise a halogen, such as fluorine, for example, in combination with any of the aforementioned species.

By "a second material which is tin (II) oxide and/or a clean thermal precursor thereof" is meant:

(i) tin(II) oxide itself, for example as a dry powder;

(ii) a material which will cleanly provide tin(II) oxide when subjected to heat in a non-oxidising atmosphere and will not introduce foreign cations or anions into the system which would remain despite the subsequent heating and exposing operations. Typical examples are stannous carboxylates such as acetate and formate and stannous hydroxide; and (iii) mixtures of (i) and (ii).

Tin(II) oxide in a physical form other than the dry powder, for example an aqueous slurry of the powder may be considered to fall within (i) or (ii).

By "clean thermal precursor of the dopant" is meant a material capable of cleanly transferring or providing dopant to the second material, at least when heated, and which does not introduce foreign cations or anions into the system which would remain despite the subsequent heating and exposing operations. For example, phosphoric acid, phosphorous acid or ammonium orthophosphate could be used to provide a phosphorus dopant. Mixed phosphorus/fluoride dopant species could be provided by the use of fluorophosphates, for example.

Tin is a cation which would remain. However it is not foreign to the system and so is acceptable. Therefore tin (II) materials similar to the "clean thermal precursors" can be used, as "tin (II) compounds comprising the dopant", for example tin (II) fluoride for a fluorine dopant.

With first material(s) in liquid form, for example, an aqueous phosphoric acid, the resulting process is a "wet" chemical process, and this itself has attendant disadvantages, for example the need to dry the combined first and second materials.

However, both first and second materials can be solids, which enables a "dry" reaction to be carried out. A preferred solid first material is diammonium orthophosphate.

It is believed that at least in some cases the method is most effectively performed with three stages of progressive heating. A first stage of heating may be necessary to drive to completion an initial step of preparing a solid intermediate material which consists essentially of tin (II) ions, oxide ions and ions providing the dopant, and/or for drying this solid intermediate materials. The second stage of heating is believed to allow the ions providing the dopant to move and assume a more uniform distribution. The third stage of heating provides a temperature at which oxidation of the solid intermediate tin(II) containing materials to the electroconductive doped tin oxide product is effective.

Nevertheless, we have found that the process is fairly robust, and it is not always necessary to distinguish between these three heating stages, nor is it necessary to confine exposure to the oxidising atmosphere to the third stage, as will be seen from the detailed description. Thus there need be no pause between the first stage and the second stage, and/or between the second stage and the third stage, and, while the oxidising atmosphere is necessary during the third stage, it can be present at the second or even the first stage. In some cases the initial reaction at ambient temperature may be sufficient to produce the solid intermediate material containing tin(II) ions, oxide ions, and dopant ions, thus rendering the first stage optional (for example to drive the reaction further).

According to a second aspect, the invention provides a method of producing electroconductive doped tin oxide comprising the steps of heating a solid material consisting essentially of tin (II) ions, oxide ions, and ions providing the dopant, and oxidising the heated materials.

The method according to the second aspect may further comprise an initial step of preparing the said solid materials, said initial step including combining a first material which is selected from:

a) A clean thermal precursor of the dopant;
b) A tin(II) compound comprising the dopant;
c) A mixture of materials which fall within (a) or (b);

with a second material which is tin(II) oxide or a clean thermal precursor thereof.

The first and second materials will be the same as those employed for the method according to the first aspect of the invention, and the initial step may in some cases, particularly where the combining is a "wet" reaction, require a drying stage to give the solid materials. Again a convenient way of performing the oxidising is by exposure to an oxidising atmosphere such as air.

It will be noted that, as with the method according to the first aspect, the method according to the second aspect also uses a starting material in which the tin is essentially present as tin (II), in contrast with most of the prior art discussed above.

DESCRIPTION OF PREFERRED EMBODIMENTS

Embodiments of the invention will now be described in more detail (Examples 1 to 8), together with a comparative Example 1 not forming part of the present invention. It is to be understood that the scope of the invention is defined by the appended claims and is not limited by these examples.

EXAMPLE 1

90 gm of stannous oxide was mixed with 20 gm of diammonium orthophosphate in a Turbula mixer. The mixture was placed in a covered alumina pot and heated to 200° C. for 17 hrs then 300° C. for 2 hrs, 400° C. for 1.5 hrs and finally 500° C. for 18 hrs. The contents of the alumina pot were removed and lightly ground to mix them. A sample was pressed at 19 MPa and found to have a volume resistivity of 24 ohm cm. The phosphorus content was estimated to be approximately 4% by weight.

A sample of the powder was further heated to 1000° C. for 4 hrs and volume resistivity measured as before. A value of 63 ohm cm was obtained showing that phosphorus doped stannic oxide is relatively insensitive to high temperature.

Comparative Example 1

The experiment described above was repeated using stannic oxide in place of stannous oxide. The resulting powder was an electrical insulator.

EXAMPLE 2

90 gm of stannous oxide was slurried with 100 ml water and 17.5 gm 85% orthophosphoric acid added with constant stirring. The slurry was dried at 110° C., homogenised, and calcined at 500° C. for 4 hrs in an open crucible. This experiment was repeated using different quantities of orthophosphoric acid with the following results:

| Amount of Acid g | Volume Resistivity at 19 MPA Ohm cm |
| --- | --- |
| 17.5 | 45 |
| 1.74 | 6 |
| .18 | 20 |
| 3.5 | 3 |

EXAMPLE 3

17.5 gm of 85% orthophosphoric acid were added dropwise to 90 gm of stannous oxide with continuous mixing. The damp solid was homogenised in a Turbula mixer and then calcined in a covered alumina pot at 200° C. for 17 hrs followed by 500° C. for 5.5 hrs. The powder was remixed and further calcined at 500° C. for 4 hrs. The resulting powder had a volume resistivity of 12 ohm cm when pressed at 19 MPa.

EXAMPLE 4

Using the techniques of example 1 a tungsten doped tin oxide was produced using 6.3 gm of ammonium tungstate and 90 gm of stannous oxide. The final powder had a volume resistivity of 8 ohm cm at 19 MPa.

EXAMPLE 5

Using the techniques of example 1 a boron doped tin oxide was produced using 2.2 gm of boric acid and 90 gm of stannous oxide. The final powder had a volume resistivity of 2.4 ohm cm at 19 MPa.

EXAMPLE 6

The experiment of example 5 was repeated with the addition of 0.74 gm of stannous fluoride to the mixture before calcining. The product had a volume resistivity of 1.77 ohm cm at 19 MPa.

EXAMPLE 7

Using the techniques of Example 1, a tantalum doped tin oxide was produced using 7.87 gm of tantalum oxide and 90 gm of stannous oxide. The final powder had a volume resistivity of 196 ohm cm at 19 MPa.

EXAMPLE 8

Using the techniques of Example 1, a niobium doped tin oxide was produced using 4.74 gm of niobium oxide and 90 gm of stannous oxide. The final powder had a volume resistivity of 743 ohm cm at 19 MPa.

What is claimed is:

1. A method of producing an electroconductive doped tin (IV) oxide wherein electroconductivity is imparted by the presence of a dopant which comprises phosphorus, boron, tungsten, tantalum, niobium or a mixture thereof, comprising producing a mixture by combining, optionally in the presence of water, a first material which is selected from the group consisting of:
 a) a dopant material which comprises the dopant, or a precursor thereof;
 b) a tin (II) compound comprising the dopant or a precursor thereof; and
 c) a mixture of materials each falling within (a) or (b);

with a second solid material which is tin (II) oxide or a precursor which on heating yields tin (II) oxide, heating the combined materials including, if water is present, drying the combined materials, and substantially completely oxidizing the heated and dry combined materials, to provide said electroconductive doped tin (IV) oxide.

2. A method according to claim 1 wherein the first material is solid.

3. A method according to claim 1 wherein the dopant comprises phosphorous.

4. A method according to claim 1 wherein the dopant is phosphorous.

5. A method according to claim 1 wherein the dopant also comprises at least one halogen.

6. A method according to claim 1 wherein the oxidising is effected by exposure to an oxidising atmosphere.

7. A method according to claim 6 wherein the oxidising atmosphere is air.

8. A method according to claim 6 wherein said exposing to said oxidising atmosphere occurs only when the combined material has been heated.

9. A method according to claim 6 wherein said exposing occurs throughout said heating.

10. A method of producing electroconductive doped tin (IV) oxide comprising the steps of heating a dry solid material consisting essentially of tin (II) oxide, and dopant material which comprises phosphorus, boron, tungsten, tantalum, niobium or a mixture thereof, and oxidizing the heated material to a degree sufficient to provide conversion of substantially all tin (II) to tin (IV).

11. A method according to claim 10 and further comprising an initial step of preparing said solid material, said initial step including combining said dopant material with a solid second material which is tin (II) oxide, a precursor which on heating yields tin (II) oxide or a mixture of said tin (II) oxide and said precursor which on heating yields tin (II) oxide.

12. A method according to claim 11 wherein the dopant material is solid.

* * * * *